(12) United States Patent
Pörnbacher

(10) Patent No.: US 6,285,471 B1
(45) Date of Patent: *Sep. 4, 2001

(54) TELECOMMUNICATIONS SYSTEM FOR TRANSMITTING IMAGES

(75) Inventor: Fritz Pörnbacher, Ergolding (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/732,214

(22) PCT Filed: Apr. 18, 1995

(86) PCT No.: PCT/DE95/00535

§ 371 Date: Oct. 24, 1996

§ 102(e) Date: Oct. 24, 1996

(87) PCT Pub. No.: WO95/30301

PCT Pub. Date: Nov. 9, 1995

(30) Foreign Application Priority Data

Apr. 29, 1994 (DE) ................................. 44 15 167

(51) Int. Cl.⁷ ...................................................... H04N 1/04
(52) U.S. Cl. ................................ 358/479; 348/14; 348/17
(58) Field of Search ......................... 379/100.01, 100.05, 379/67; 348/14, 17, 24; 358/400, 401, 434, 435, 436, 438, 479, 402

(56) References Cited

U.S. PATENT DOCUMENTS 4,099,202  7/1978  Cavanaugh ............................ 348/17
4,450,487 * 5/1984  Koide .................................. 358/335

(List continued on next page.)

FOREIGN PATENT DOCUMENTS 1 487 813  4/1969  (DE) .
36 39 026  5/1987  (DE) .

(List continued on next page.)

OTHER PUBLICATIONS

Fifth Nordi Seminar On Digital Mobile Radio Communications, Dec. 1–3, 1992, "The SIEMENS D900 solution for Fax Group 3 support in the Interworking Functin", I. Dittrich, pp. 55–62.

From Pioneers to the 21st Century, Vehicular Technology Society 42nd VTS Conference Frontiers of Technology, May 10–13, 1992, "Error Free Group 3 Facsimile Terminal For Cellular Mobile Telephone Circuit", Manabu Kawabe et al, pp. 89–92.

(List continued on next page.)

Primary Examiner—Jerome Grant, II
(74) Attorney, Agent, or Firm—Schiff Hardin & Waite

(57) ABSTRACT

On the transmission side, an image, for example a black-and-white individual image, is picked up and stored on request by a simple camera, for example with a wide-angle lens and optical viewfinder. The image data of the image message are suitably compressed and subsequently coded with a telecommunications-channel-specific code and transmitted, preferably unidirectionally, indirectly or directly to a telecommunications network (for example a wired or wireless telephone network). On the reception side, the image data are accepted—in a way corresponding to the process on the transmission side—either directly or indirectly. After decompression and decoding, the image data are stored in a screen store and transmitted to the screen, for example an LCD flat screen, according to the instructions of a screen controller. Both the transmission device and the reception device can thus be designed to be compact—for the purpose of fast image transmission combined with a simple switching and programming structure—, mobile and independent of telecommunications channels.

23 Claims, 2 Drawing Sheets

U.S. PATENT DOCUMENTS

| | | | |
|---|---|---|---|
| 4,897,732 | | 1/1990 | Kinoshita et al. ............ 358/335 |
| 5,063,587 | | 11/1991 | Takayoshi et al. ............ 348/14 |
| 5,239,373 | | 8/1993 | Tang et al. ............ 358/93 |
| 5,260,989 | | 11/1993 | Jenness et al. ............ 370/329 |
| 5,381,412 | * | 1/1995 | Otani ............ 370/84 |
| 5,412,710 | * | 5/1995 | Tanaka ............ 379/67 |
| 5,539,811 | * | 7/1996 | Nakamura ............ 379/94 |
| 5,594,736 | * | 1/1997 | Tatsumi ............ 370/474 |
| 5,640,195 | * | 6/1997 | Chida ............ 348/13 |
| 5,717,496 | * | 2/1998 | Satoh ............ 358/402 |
| 5,914,787 | * | 6/1999 | Satoh ............ 358/402 |

FOREIGN PATENT DOCUMENTS

| | | |
|---|---|---|
| 0506544 | 9/1992 | (EP) . |
| 0523617 | 1/1993 | (EP) . |
| 0523618 | 1/1993 | (EP) . |
| 0524623 | 1/1993 | (EP) . |
| 0539695 | 5/1993 | (EP) . |
| WO 92/21211 | 11/1992 | (WO) ............ H04N/7/14 |

OTHER PUBLICATIONS

NTT Review, vol. 4, No. 4, Jul. 1992, "Tele–Eye—Real–time Visual Communication System Using ISDN", T. Hoshi, pp. 86–90.

Electronic Design, vol. 40, No. 5, Mar. 1992, Chip Set Targets Pocket and Laptop Modems, M. Leonard, pp. 127–128.

W. & S. Wirtschaftstechnik and Sicherheitstechnik, No. 4, Apr. 1, 1993, Bildtransfer per Telekom Mit DVST Schon Videobilder Vor Dem Alarm, Von Jeff Berg, pp. 263–266.

Festbilduebertragung FB 64, Firmenprospekt ANT, Aug. 1991, 12 pages.

Elektrisches Nachrichtenwesen, 3 Quartal 1993, Bildtelefon–Kommunikation, F.W. Krueger, pp. 241–247.

* cited by examiner

TELECOMMUNICATIONS SYSTEM FOR TRANSMITTING IMAGES

BACKGROUND OF THE INVENTION

The invention relates to a telecommunications system for transmitting images according to the preamble of patent claim 1.

In communication systems having a message transmission link between a message source and a message receiver, transmitting and receiving devices are used for message processing and transmission. The message produced by the message source is transmitted from the transmitting device via a communication channel to the receiving device, which subsequently delivers the received message to the message receiver. The message processing and transmission may in this case take place in a preferred direction of transmission or in both directions of transmission (duplex operation).

"Message" is a generic term which stands both for the meaningful content (information) and for the physical representation (signal). In spite of the same meaningful content of a message—that is to say the same information—different signal forms may occur. For example, a message concerning one subject may be transmitted
(1) in the form of an image,
(2) as a spoken word,
(3) as a written word,
(4) as an encoded word or image.
The type of transmission according to (1) . . . (3) is in this case normally characterized by continuous (analog) signals, while in the case of the type of transmission according to (4) usually discontinuous signals (for example pulses, digital signals) are produced. The present invention relates primarily to the transmission of visual messages (for example images, personal recordings (videos), diagrams, lettering etc) and, to complement this, it relates to a combination of the transmission of visual messages and acoustic messages (for example image/sound transmission etc), the respective signal form generally being a mixture of continuous signals and discontinuous signals. Depending on this message type, on which the invention is based, for the communication system (telecommunications system) defined above there are required in each case message-type-specific telecommunication devices for the functions of "transmitting" and "receiving". The question as to which telecommunications devices are ultimately used depends, inter alia, also on which communication channel is taken as a basis in the communication system. For the present invention, the communication channel is of only secondary significance, because the principle of the invention can be applied to wired and/or wireless telecommunications channels.

With respect to the already mentioned directions of transmission within the communication system, for the present invention unidirectional message transmission is the primary form. However, this in turn does not mean that it cannot also be used for duplex operation.

In the transmission of images according to the above definition, a distinction is made between moving image transmission and individual image transmission. The most widespread application of image transmission is television engineering, in which both individual images and moving images are transmitted via wired and wireless communication channels. On this basis, there were initial attempts in the 70s to develop video telephones which transmit images over the existing telephone network from a transmitter (A subscriber) to a receiver (B subscriber). The first video telephones primarily comprised three individual device elements, namely a telephone, a camera and a monitor. The innovative development of microelectronics and communication transmission technology means that today there are already integrated video telephones, in which these device elements are combined in a single telephone. The development of such video telephones, working in duplex operation, has come very much to the forefront in recent years from the aspect of moving image transmission in accordance with CCITT Standard H.261 for video communication. Published patent applications which document this development trend are, for example, EP-A1-0 506 544, EP-A2-0 523 618, EP-A2-0 524 623 and EP-A2-0 523 617. However, apart from the fact that the image transmission is quite slow, expensive and not mobile, the realization of such moving image telephones has the disadvantage that the application is limited by standard incompatibility, because the telephone device and video device are inseparably connected in one device and therefore video telecommunication can take place only among those communication subscribers which have the same video telephone. This can in particular have the result—in the case of such fixed forms of transmission— that there are restrictions for the transmission systems, such as the ISDN system.

SUMMARY OF THE INVENTION

The object on which the invention is based consists in setting up a telecommunications system for transmitting images, in particular black-and-white individual images, which makes possible transmission which is much simpler and can be used universally.

In general terms the present invention is a mobile transmission device for transmitting images having: first means for optically capturing a transmission image motif and producing an image message from the transmission image motif; second means for processing appropriately for transmission the image message produced; third means for transmitting the image message, which can be connected via a telecommunications channel to a reception device for receiving the image message; and fourth means for controlling the functional sequences in the transmission device, in particular the first to third means. The first to fourth means are designed and connected in such a way that, when a telecommunications connection is set up between the transmission device and the reception device by the transmission of voice or control data initiating the image transmission, the image message is transmitted on the telecommunications channel time-shifted with respect to the transmitted voice or control data and independently of the type of telecommunications channel.

Advantageous developments of the present invention are as follows.

The third means are connected directly to the telecommunications channel.

The third means are connected via an acoustic coupling with a telephone set to the telecommunications channel.

The first to fourth means are contained in a mobile part of a wireless telephone.

The first means and fourth means are designed in such a way that the image information contained in the image message is composed of 100 Pt 100 image pixels having 16 shades of gray which can be represented by 4 bits per image pixel.

The first to fourth means are designed in such a way that, of the data bits defining the image pixels of the image information, initially only the most-significant bit is transmitted and, in the image build-phases which follow, the respectively next-most-significant bit is transmitted.

The first means and fourth means are designed in such a way that, beginning from the center point of the transmission image motif, pixels of the transmission image motif arranged toward the outside are composed spirally to form image information of the image message.

The first to fourth means are designed in such a way that the image message is transmitted together with an error detection code.

On the transmission side, an image, for example a black-and-white individual image, is picked up and stored on request by a simple camera, for example with a wide-angle lens and optical viewfinder (for example by pressing a button or by remote control). The image data of the image message (image signal plus image information) are suitably compressed (for example according to the technical method disclosed in the published international application WO 92/17981 entitled "Method for the compression of image data", for example in the patent claims and the abstract) and are subsequently coded with a telecommunications-channel-specific code, for example a line code, and transmitted, preferably unidirectionally, indirectly, for example via an acoustic coupler (loudspeaker), or directly, for example via an electrical connection (telecom plug connection or modem), to a telecommunications network (for example wired or wireless telephone network).

On the reception side, the image data can be accepted—in a way corresponding to the process on the transmission side—either directly (telecom plug connection, modem) or indirectly (acoustic coupler or optocoupler). After decompression and decoding, the image data are stored in a screen store and transmitted to the screen, for example an LCD flat screen, according to the instructions of a screen controller.

Both the transmission device and the reception device can be designed to be compact—for the purpose of fast image transmission combined with a simple switching and programming structure—, mobile and independent of telecommunications channels, if preferably a black-and-white individual image with 100 Pt100 pixels and 16 shades of gray is transmitted via simple acoustic couplers or modems at a transmission rate of, for example, 1 kbit/s.

The first to fourth means are designed in such a way that neighboring pixels or groups of pixels of the transmission image motif are composed in a time-shifted or interleaved mode to form image information of the image message. Also, the first to fourth means are designed in such a way that the speed at which the image messages are transmitted is adapted to the quality of the telecommunications channel. These embodiments achieve the effect of fast image build-up. In particular with the development as claimed in claim 10, a complete image can be represented even after one quarter of the transmission time, albeit with only 2 brightness values.

The first to fourth means are designed in such a way that actual brightness values of the transmitted image message are assigned desired brightness values stored in an assignment table. This embodiment achieves the effect that the generally most important information in the center of the image is transmitted first. In the case of this type of transmission, the recipient of the image message (B subscriber) does not have to wait so long for significant image contents if the image build-up overall takes several seconds.

The first to fourth means are designed in such a way that the actual brightness values are adapted to the desired brightness values stored in the assignment table to utilize the brightness dynamic range before the assignment. This embodiment has the effect in an advantageous way that individual transmission errors scarcely have any disturbing effect any longer. For example—with a corresponding development of the invention—for each pixel transmitted with an error, the mean value of the neighboring pixels can be displayed on the reception side.

The interleaved or time-shifted composition of pixels in the case of neighboring pixels or groups of pixels achieves the effect that any possibly occurring transmission errors, which would normally destroy many pixels, are not so clearly visible; this is so since, if between the disturbed pixels there are repeatedly correctly transmitted pixels, the visibility of the error can be distinctly reduced by this manner of error correction.

The first to fourth means are remote-controllable. The adaptation of the transmission speed to the quality of the telecommunications channel can be controlled via a signalling channel assigned to the reception device.

The fourth means are remote-controllable by dialing by means of a telephone. By the use of an assignment table with stored desired brightness values an optimum assignment of the brightness stages available to the actual brightness stages in the image to be transmitted is possible in particular when the desired brightness values in the assignment table are based on a brightness range which has been determined on the basis of the average brightness of the ten brightest pixels and the ten darkest pixels and when the assignment table is transmitted before the actual image transmission.

The first means have optical searching means for the selection of an image motif area to be transmitted. The development achieves the effect of enhancing the contrast of the image message.

The first means for capturing the transmission image motifs have focusing devices. With the development, for example individual images can be picked up and held until the complete image is transmitted. In addition, the individual images can also be initially just picked up and not transmitted until later. Furthermore, it is possible, given a correspondingly large store, also for a plurality of individual images to be picked up before transmission.

The following developments relate to measures on the transmission device to make it more user-friendly to handle.

A mobile reception device for receiving images, has: fifth means for receiving an image message transmitted by a transmission device, which can be connected via a telecommunications channel to a transmission device; sixth means for processing appropriately for display the image message received; seventh means for displaying the image message in the form of a reception image motif which is an image of a transmission image motif optically captured by the transmission device; and eighth means for controlling the functional sequences in the reception device, in particular of the fifth to seventh means. The fifth to eighth means are designed and connected in such a way that, when a telecommunications connection is set up between the transmission device and the reception device by the transmission of voice or control data initiating the image transmission, the image message is received on the telecommunications channel time-shifted with respect to the received voice or control data and independently of the type of telecommunications channel.

Advantageous developments of this embodiment of the present invention are as follows.

The fifth means are connected directly to the telecommunications channel.

The fifth means are connected via an acoustic coupling with a telephone set to the telecommunications channel.

The fifth to eighth means are contained in a mobile part of a wireless telephone.

A second image message store for buffer-storing the image messages is provided.

Ninth means for signalling control signals to the transmission device are provided.

The ninth means for signalling the control signals to the transmission device are designed in such a way that the control signals are transferred directly or via an acoustic coupling to the telecommunications channel.

The reception device is designed as a portable personal computer (notebook).

A connection interface for a personal computer is provided. The reception device has means for signalling control signals by which, for example, the transmission speed can be adapted to the quality of the telecommunications channel and by which the end of an image transmission can be signalled to the transmission device.

The fifth to eighth means are remote-controllable. The fifth to eighth means are remote-controllable by dialing by means of a telephone. These embodiments relate to ideas for using a data processing device (personal computer, notebook etc) at least partially for the reception-device-specific functions.

The transmission device and the reception device is used in a telephone system for the transmission of images. The development specifies in particular use of the system according to the invention for room surveillance.

The transmission device and the reception device are used in a telephone system for black-and-white image transmission, a monitoring device, a telephone system for the targeted transmission of visual information, and/or a device based on the "movable eye" principle by direct coupling of the transmission device to the reception device.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
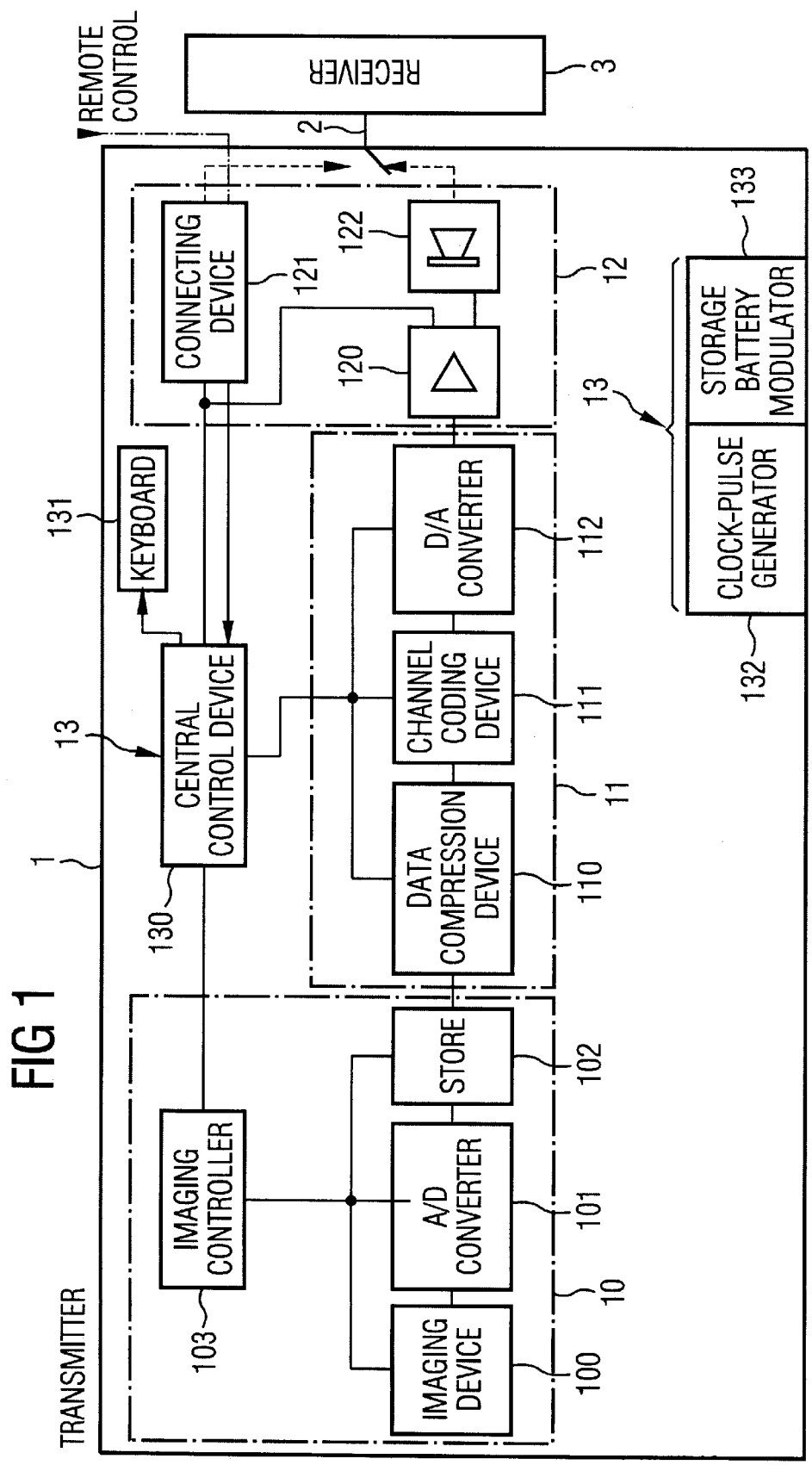
FIG. 1 shows the basic setup of a telecommunications system for transmitting individual images with the emphasis on the transmission side and FIG. 2 shows the basic setup of a telecommunications system for transmitting individual images with the emphasis on the reception side.

FIG. 1 shows a transmission device 1 (transmitter), which essentially comprises four transmission subdevices—a first transmission subdevice 10 for recording a transmission image motif in the form of an image message, a second transmission subdevice 11 for processing the recorded image message, a third transmission subdevice 12 for transmitting the image message and a fourth transmission subdevice 13 for controlling and supplying the first to third subdevices 10, 11, 12. The individual transmission subdevices 10 . . . 13 form a functional unit in such a way that preferably black-and-white individual images can be transmitted via a telecommunications channel 2, for example a telephone line, to a reception device 3 (receiver).

Of course, it is also possible a) to transmit color images instead of black-and-white individual images if a slower image build-up is accepted, b) to transmit moving images instead of individual images if a slower image build-up is accepted and/or c) to use a wireless telecommunications channel (wireless or mobile radio systems) instead of a wired telecommunications channel.

Figure 2:
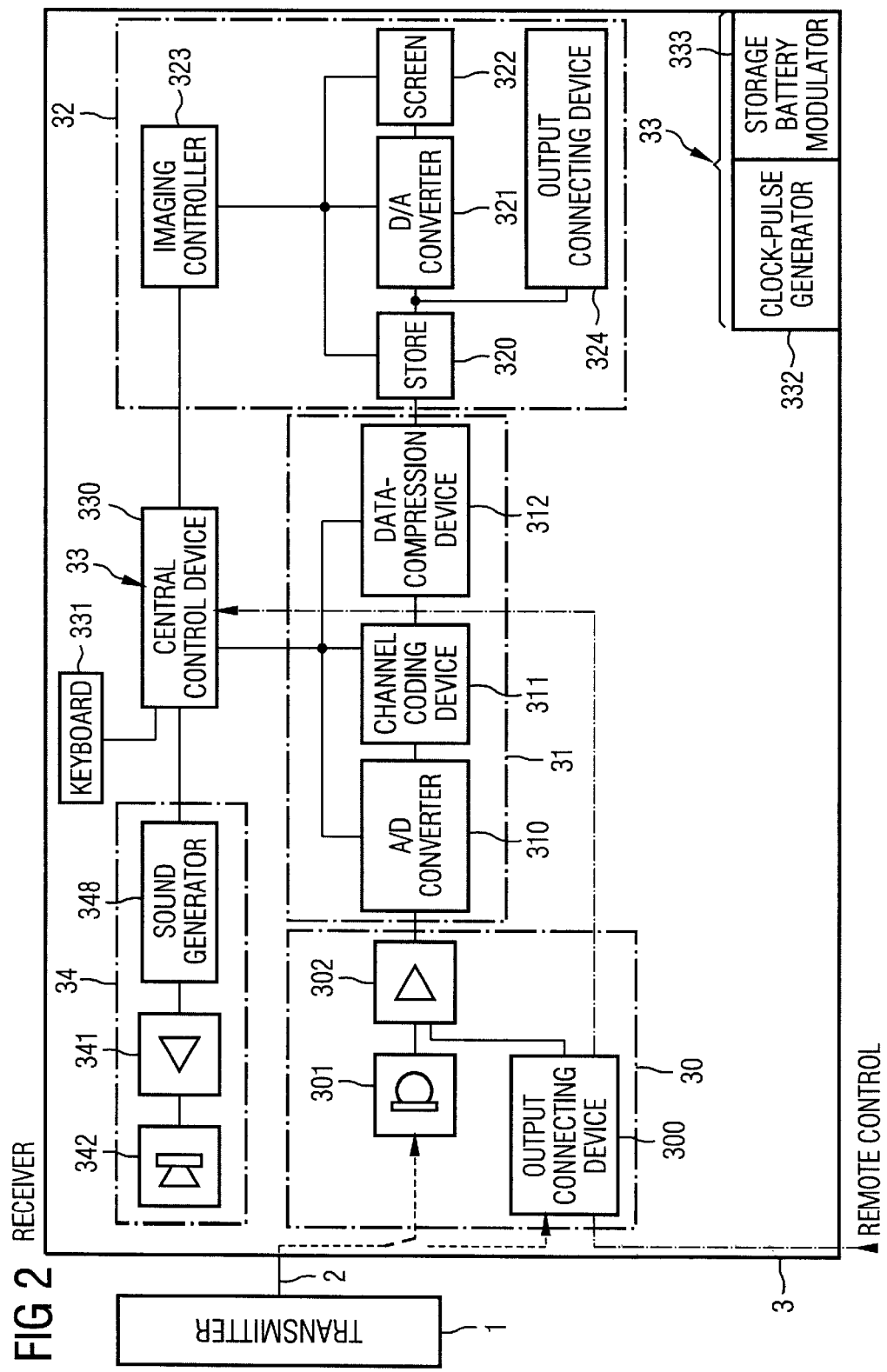

The setup of a reception device 3 in such a telecommunications system for transmitting images is explained by the description of FIG. 2.

For recording the transmission image motif in the form of the image message, the first transmission subdevice 10 is assigned an imaging device 100, a transmitter-specific analog/digital converter 101, a transmitter-specific store 102 and a transmitter-specific imaging controller 103. With the imaging device 100, which for example comprises a camera with an optical system (for example focusing device, telephoto lens with zoom function etc), an optical viewfinder and a CCD element, the image motif to be transmitted is initially captured. This capturing of the transmission image motif is controlled by the imaging controller 103—for example by means of controllable actuators, such as for example motors for turning the camera or for setting the focusing device or the zoom. In this case, the imaging controller 103 is for its part again controlled by a transmitter-specific central control device 130 in connection with a keyboard 131. The central control device 130 and the keyboard 131 are component parts of the fourth transmission subdevice 13.

The control described above may, however, alternatively also be performed as remote control, it being possible for the said elements of the imaging device 100 (for example camera, focusing optics, viewfinder etc) to be remote-controlled by a remote control device, for example a telephone by means of DTMF code, a wireless telephone etc, via the central control device 130 and the imaging controller 103.

After the capture of the transmission image motif by the imaging device 100, the image motif is converted in the analog/digital converter 101 into a digital image message, which is buffer-stored in the store 102. For the analog/digital conversion and the buffer storage, the analog/digital converter 101 and the store 102 are controlled by the imaging controller 103. In addition, the imaging controller 103 also controls the transmitter-internal transmission from the store 102 to the second transmission subdevice 11. In order that the imaging controller 103 can also perform these control tasks assigned to it, there is a master-slave relationship between the imaging controller 103 and the central control device 130 with respect to the control tasks in the transmission device 1, with the central control device 130 as the "master" and the imaging controller 103 as the "slave".

The central control device 130, in connection with the keyboard 131 or with the remote control option (dash-dotted arrow in FIG. 1), is responsible for controlling all the functional sequences in the transmission device 1. For this purpose, the central control device 130 is preferably designed as a microprocessor. Supplying the central control device 130 and the first to third transmission subdevices 10, 11, 12 with clock pulses and power takes place by means of a transmitter-specific clock-pulse generator 132 and a transmitter-specific storage battery 133, which, like the central control device 130, are assigned to the fourth transmission subdevice 13 and are of a known design. The central control device 130 assumes not only the functional control of the imaging controller 103 but also the control of the second and third transmission subdevices 11, 12.

The second transmission subdevice 11 essentially comprises a data compression device 110, a channel coding device 111 and a transmitter-specific digital/analog converter 112, which all have a control connection to the central control device 130. As a consequence of the controlling by the imaging controller 103 of the first transmission subdevice 10, the digital image message buffer-stored in the store 102 is fed to the data compression device 110. In the data compression device 110, this image message is compressed in a known way (for example according to the technical method disclosed in the published international application WO 92/17981 entitled "Method for the compression of image data", for example in the patent claims and the abstract). Subsequently, the compressed image message is coded in the channel coding device 111 with a channel code, likewise in a known way. The compressed and channel-coded image message is subsequently converted in the digital/analog converter 112 into an analog image message which can be transmitted on the telecommunications channel 2.

In the third transmission subdevice 12, this analog image message is amplified in a transmission amplifier 120 before it is fed either to an electrical transmitter-specific connecting device 121 or to an acoustic transmitter-specific coupling device 122 for the transmission to the reception device 3. These two transmission possibilities are represented in principle by a switch identified by dashed lines in FIG. 1. While in the case of the electrical connection the transmission device 1 is connected to the telecommunications channel 2 directly via the connecting device 121, in the case of the acoustic coupling a direct connection is not possible.

In the case of the direct electrical connection, the connecting device 121 is preferably designed as a telecom line unit or modem—for example in the case of a telephone line as a telecommunications channel.

In the case of the acoustic coupling between the transmission device 1 and the telecommunications channel 2, an additional device establishing the acoustic coupling is needed (not shown in FIG. 1). Suitable for this purpose—given the telecommunications channel 2 in the form of a telephone line—is preferably a conventional telephone (A subscriber telephone), which on the one hand has a connection to the telecommunications channel 2 and in which on the other hand the handset microphone or hands-free microphone can be used to establish an acoustic coupling with the acoustic coupling device 122 of the transmission device 1. In the case of this type of acoustic coupling, the acoustic coupling device 122 of the transmission device 1 is expediently designed as a loudspeaker.

The connecting device 121 is preferably also used to carry out the remote control of the central control device 130 and consequently —given corresponding switching and programming preconditions in the control sequence of the transmission device 1—of the entire transmission device 1.

FIG. 2 shows on the basis of FIG. 1 the setup of the reception device 3, which essentially comprises—in a way corresponding to the setup of the transmission device 1—four reception subdevices—a first reception subdevice 30 for receiving the analog image message transmitted by the transmission device 1 according to FIG. 1, a second reception subdevice 31 for processing the received image message, a third reception subdevice 32 for displaying the received image message in the form of a reception image motif and a fourth reception subdevice 33 for controlling and supplying the first to third reception subdevices 30, 31, 32. The individual reception subdevices 30 . . . 33 form a functional unit in such a way that the black-and-white individual images recorded by the transmission device are reproducible in a location-shifted and time-shifted mode and independently of the telecommunications channel.

The analog image message transmitted over the telecommunications channel 2 by the transmission device 1 according to FIG. 1 is received by the first reception subdevice 30. The reception subdevice 30 has for this purpose—with respect to the possibilities for the transmission of the image message provided with the transmission device 1 according to FIG. 1—in the case of electrical transmission a receiver-specific input connecting device 300 corresponding to the transmitter-specific connecting device 121 and in the case of acoustic coupling a receiver-specific acoustic coupling device 301 corresponding to the transmitter-specific acoustic coupling device 122.

In a way corresponding to the coupling in of the analog image message into the telecommunications channel 2 on the transmission side, the coupling out of the analog image message from the telecommunications channel 2 proceeds on the receiver side. While in the case of electrical transmission the input connecting device 300 —like the connecting device 121—is assigned directly to the telecommunications channel 2, for acoustic coupling out again an additional device adapted to the telecommunications channel 2, for example in the case of a telephone line a telephone (B subscriber telephone), is required between the telecommunications channel 2 and the acoustic coupling device 301.

Due to the fact that the B subscriber telephone is connected via the telephone line 2 to the A subscriber telephone, the analog image message coupled in acoustically on the receiver side is transmitted to the B subscriber telephone at its receiver capsule in the handset or at its open-listening loudspeaker. If the acoustic coupling device 301 is then assigned either to the receiver capsule or to the open-listening loudspeaker—in the sense of acoustic coupling—, as a result the analog image message transmitted by the transmission device 1 can be received at the reception device 3.

The analog image message received indirectly or directly is subsequently fed to a reception amplifier 302 of the reception subdevice 30. Thereafter, the amplified image message is fed receiver-internally to the second reception subdevice 31. This second reception subdevice 31 essentially comprises a receiver-specific analog/digital converter 310, a channel decoding device 311 and a data decompression device 312, which are connected one behind the other in the specified sequence and all are controlled by a central receiver-specific control device 330 of the fourth reception subdevice 33. The central control device 330, in connection with a receiver-specific keyboard 331, is responsible for controlling all the functional sequences in the reception device 3 and is preferably designed as a microprocessor. However, the receiver-specific central control device 330 may also—like the transmitter-specific central control device 130—be remote-controlled via the input connecting device 300 (dash-dotted arrow in FIG. 2). In addition to the central control device 330, the reception subdevice 33 is assigned a receiver-specific clock-pulse generator 332 and a receiver-specific storage battery 333 for supplying the reception device 3 with clock pulses and power.

In the analog/digital converter, the analog image message is converted into a digital image message. To be able to display the image information contained in this digital image message, the digital image message must be decoded and decompressed again. This takes place under the master control of the central control device 330 in the channel decoding device 311 and the data decompression device 312. The central control device 330 is also responsible for transferring the digital image message, once it has finally been decompressed, from the data decompression device 312 of the second reception subdevice 31 to the third reception subdevice 32 for displaying the received digital image message in the form of a reception image motif.

The third reception subdevice 32 essentially comprises a receiver-specific store 320, a receiver-specific digital/analog converter 321, a screen 322 and a screen controller 323. The transfer of the digital image message from the data decompression device 312 into the third reception subdevice 32 is reported to the screen controller 323 by the central control device 330. The screen controller 323 then initiates and controls the buffer storage of the digital image message in the store 320. Depending on whether the buffer-stored image message is to be displayed on the receiver-internal screen 322 or an external display device, the buffer-stored image message is fed in the case of receiver-internal display to the digital/analog converter 321 or—in the case of external display—to an output connecting device 324.

In the case of receiver-internal display, the buffer-stored image message is converted in the digital/analog converter 321 back into an analog image message. This analog image message contains a reception image motif, which finally is represented on the screen 322. The digital/analog conversion and the representation of the reception image motif is in this case in turn controlled by the screen controller 323. Between the imaging controller 323 and the central control device 330 there is again the master-slave relationship with respect to the control tasks in the reception device 3—as in the case of the transmission device 1 according to FIG. 1—with the central control device 330 as the "master" and the imaging controller 323 as the "slave".

In the case of external display, the image message buffer-stored in the store 320 is transferred unconverted via the output connecting device 324 to the external display device (not shown in FIG. 2). The external display device may be, for example, a personal computer or a laptop (notebook), which are connected to the reception device 3 via the output connecting device 324, designed as a parallel or serial interface.

To be able to report complete reception of the transmitted image message to the operator of the transmission device 1, in the reception device 3 there is provided a fifth reception subdevice 34 for signalling purposes. The reception subdevice 34 is connected for this purpose to the central control device 330 and the keyboard 331. In the case of the reception subdevice 34, the signalling preferably takes place by sound transmission; for this reason, said device has—connected one after the other in the following sequence—a sound generator 340, an amplifier 341 and a loudspeaker 342 for acoustic coupling in of the sound signal into the telecommunications channel 2. Instead of acoustic coupling between the reception subdevice 34 and the telecommunications channel 2 for feeding in the sound signal, direct electrical feeding in is also possible, for example via the connecting device 300. For this purpose, the latter would then have to be designed for bidirectional transmission.

The controlling of the telecommunications system described above for transmitting images usually takes place by verbal communication between the communication subscribers (A subscriber, B subscriber). Alternatively, however, it is also possible for the telecommunications system to be controlled by the reception device 3. This type of control is achieved by inputting DTMF signals or an infotip. If in this case exclusively image communication is to be set up, the caller of the image reception device identifies himself by the input of a code number. This principle is already used in the case of the babyphone function in answering machines. From the reception device, the imaging in the transmission device is triggered and, if appropriate, further images can also be requested. In addition, it is also possible to provide continuous image transmission, in which, for example, a new image is transmitted every two to three seconds. On the basis of the above description of the exemplary embodiment, the mobile capability of the transmission and reception device 1, 3 allows a distinction to be made between the following application situations:

(1) camera and screen stationary,
(2) camera stationary and screen mobile,
(3) camera mobile and screen stationary,
(4) camera and screen mobile.

The above application situations can be used, for example, for monitoring purposes (babysitter function, monitoring of those requiring care, building security, traffic surveillance, monitoring at filling stations etc).

In addition, the application situations can also be used for the targeted transmission of visual information (for example in support of service tasks in the private or business sector, in the recording of insurance losses, in the transmission of wanted photos to police officers, when giving advice on important decisions (for example the buying or viewing of a house), in preparation for desktop publishing applications etc).

Finally, it is also possible to use the above application situations for the "movable eye" principle, by coupling the transmission device 1 directly to the reception device 3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile electronic camera for sending images comprising:

a first assembly for optically capturing a transmission image motif and producing an image message from the transmission image motif;

a second assembly configured to process the produced image message for transmission;

connected to a telecommunication channel, the electronic monitor for receving the image message via the telecommunication channel; and a fourth assembly for controlling function sequences in the first, second, and third assemblies of the mobile electronic camera;

wherein the mobile electronic camera is connectable both to a mobile wireless telecommunication device and to a wirebound telecommunication device, and the first, second, third and fourth assemblies are configured and connected in such a way that the image message is transmitted independent of a type of the telecommunication travel.

2. The mobile electronic camera as claimed in claim 1, wherein at least one of the mobile wireless telecommunication device and the wirebound telecommunication device, the electronic camera and the electronic monitor are configured to form a telecommunication arrangement that is controlled by one of verbal communication between communication subscribers and remote control.

3. The mobile electronic camera as claimed in claim 1, wherein the third assembly is connected directly to the telecommunication channel.

4. The mobile electronic camera as claimed in claim 1, wherein the third assembly is connected to the telecommunication channel via an acoustic coupling to a telecommunication device selected from the group consisting of the mobile wireless telecommunication device and the wirebound telecommunication device.

5. The mobile electronic camera as claimed in claim 1, wherein the first, second, third and fourth assemblies are contained in the mobile wireless telecommunication device.

6. The mobile electronic camera as claimed in clam 1, wherein the first assembly and the fourth assembly are constructed such that the image information contained in the image message is composed of 100×100 pixels having 16 shades of gray that are represented by 4 bits per image pixel.

7. The mobile electronic camera as claimed in claim 1, wherein the first, second, third and fourth assemblies are configured in such a way that, of data bits defining the image pixels of the image information, initially only a most significant bit is transmitted and a next-most-significant bit is transmitted in subsequent image build-up phases.

8. The mobile electronic camera as claimed in claim 1, wherein the first and fourth assemblies are configured such that, beginning from a center point of the transmission image motif, pixels of the transmission image motif arranged toward an outside portion of the transmission image motif away from the center point are spirally arranged to form image information of the image message.

9. The mobile electronic camera as claimed in claim 1, wherein the first, second, third and fourth assemblies are configured to transmit an error detection code together with the image message.

10. The mobile electronic camera as claimed in claim 1, wherein the first, second, third and fourth assemblies are configured so that one of neighboring pixels and groups of pixels of the transmission image motif are arranged in one of a time-shifted mode and an interleaved mode to form image information of the image message.

11. The mobile electronic camera as claimed in claim 1, wherein the first, second, third and fourth assemblies are configured such that a speed at which the image messages are transmitted is adapted to a quality of the telecommunications channel.

12. The mobile electronic camera as claimed in claim 1, wherein first, second, third and fourth assemblies are configured such that actual brightness values of the transmitted image message are assigned desired brightness values stored in an assignment table.

13. The mobile electronic camera as claimed in claim 12, wherein the first, second, third and fourth assemblies are configured such that the actual brightness values are adapted to the desired brightness values stored in the assignment table to utilize a brightness dynamic range before the assignment.

14. The mobile electronic camera as claimed in claim 1, further comprising a first image message store for bufferstoring the image messages.

15. The mobile electronic camera as claimed in claim 1, wherein the first, second, third and fourth assemblies are remote-controllable.

16. The mobile electronic camera as claimed in claim 15, wherein the fourth assembly is remote-controllable by dialing from a telephone.

17. The mobile electronic camera as claimed in claim 1, wherein the first assembly has an optical searching device that is configured for selection of an image motif area to be transmitted.

18. The mobile electronic camera as claimed in claim 1, wherein the first assembly for optically capturing the transmission image motifs includes one or more focusing devices.

19. The mobile electronic camera as claimed in claim 1, wherein the mobile electronic camera is a part of a telecommunication arrangement for transmitting images.

20. The mobile electronic camera as claimed in claim 1, wherein the mobile electronic camera is a part of a telecommunication arrangement for transmitting black-and-white images.

21. The mobile electronic camera as claimed in claim 1, wherein the mobile electronic camera is a part of a surveillance device.

22. The mobile electronic camera as claimed in claim 1, wherein the mobile electronic camera is a part of a telecommunication arrangement for targeted transmission of visual information.

23. The mobile electronic camera as claimed in claim 1, wherein the electronic camera is directly coupleable with an electronic monitor.

* * * * *